United States Patent [19]

King et al.

[11] 3,936,389

[45] *Feb. 3, 1976

[54] BIS GLYCOL ESTER OF SODIUM SULFO ISOPHTHALIC ACID FROM ITS DIMETHYL ESTER

[75] Inventors: Henry L. King; John W. McGee, both of Cary, N.C.

[73] Assignee: Monsanto Company, St. Louis, Mo.

[ * ] Notice: The portion of the term of this patent subsequent to Aug. 19, 1992, has been disclaimed.

[22] Filed: June 14, 1973

[21] Appl. No.: 370,073

[52] U.S. Cl. .............. 252/182; 260/75 S; 260/470
[51] Int. Cl.² ........................................ C08G 79/00
[58] Field of Search .............. 252/182, 188.3 R; 260/75 S, 470

[56] References Cited
UNITED STATES PATENTS

| | | | |
|---|---|---|---|
| 3,033,824 | 5/1962 | Huffman | 260/75 S |
| 3,060,152 | 10/1962 | Ringwald | 260/75 S |
| 3,169,944 | 2/1965 | Scott et al. | 260/75 S |
| 3,634,541 | 1/1972 | Kelkheim et al. | 260/75 S |
| 3,636,131 | 1/1972 | Davis et al. | 260/75 S |
| 3,639,352 | 1/1972 | Katsoura et al. | 260/75 S |
| 3,663,508 | 5/1972 | Mobius et al. | 260/470 |
| 3,725,348 | 4/1973 | Harrison et al. | 260/75 S |

FOREIGN PATENTS OR APPLICATIONS

| | | | |
|---|---|---|---|
| 1,593,010 | 7/1970 | France | 260/75 S |
| 1,210,780 | 10/1970 | United Kingdom | 260/75 S |

OTHER PUBLICATIONS

Encyclopedia of Chemical Technology, Vol. 16, 1968, 2nd Edition, John Wiley, pp. 165, 166, 174, 175, 176, 177.

*Primary Examiner*—Leland A. Sebastian
*Assistant Examiner*—Irwin Gluck
*Attorney, Agent, or Firm*—Thomas Y. Awalt, Jr.

[57] ABSTRACT

Glycol solutions of a bis glycol ester of a difunctional aromatic compound possessing one or more metallo sulfonate groups suitable for use in continuous or non-continuous preparation of fiber-forming cationic dyeable copolyesters by copolymerization with a low molecular weight glycol-dicarboxylic acid prepolymer are prepared by reacting the dimethyl ester of a metallo sulfo dicarboxylic acid with glycol at a mole ratio of about 4–30 of the glycol to 1 of the dimethyl ester, under ester interchange conditions so as to provide a solution of the bis glycol ester of the metallo sulfo dicarboxylic acid in glycol containing about 20–75% of the bis glycol ester having a carboxyl plus carboxylate content of not more than about 200 $\mu$eq/g of bis glycol ester, and no more than about 10 weight percent of glycol ether based on bis glycol ester. A conventional ester interchange catalyst and glycol ether suppressant may be employed.

16 Claims, No Drawings

BIS GLYCOL ESTER OF SODIUM SULFO ISOPHTHALIC ACID FROM ITS DIMETHYL ESTER

This invention relates to new and improved high molecular weight modified polyesters. More particularly this invention relates to fiber-forming modified polyesters having improved dyeability and affinity for basic dyes, and to methods for making said modified polyesters and intermediates therefor.

Polymeric linear polyesters are readily prepared by heating together dihydric alcohols or functional derivatives thereof and dibasic carboxylic acids or polyester-forming derivatives thereof such as acid halides, salts, or simple esters of volatile alcohols. Highly polymerized polyesters can be formed into filaments, fibers, films and the like which can be permanently oriented. The most widely known and most important commercially of the polymeric polyesters is that prepared by the condensation of terephthalic acid or dimethyl terephthalate and ethylene glycol. These polyester materials in drawn fiber or filament form cannot be satisfactorily dyed by the ordinary dyeing procedures used in dyeing cotton, wool, natural silk, and regenerated cellulose. It is recognized that unless the fiber-forming polyesters can be readily dyed by commercial dyeing processes, the utility of the polymer in the textile field will be limited. The compact structure of polyethylene terephthalate fibers, the molecules of which are closely packed along the axis of the fiber, makes it quite difficult, except with a limited number of dyes, and under extreme conditions of temperature and pressure, to obtain a satisfactory degree of dye-bath exhaustion, or to secure satisfactory deep shades in the fibers. Absorption and penetration of the dye into the fiber core are limited by inherent properties of the fiber.

A number of methds have been proposed to increase the dyeability of the polyesters and particularly polyethylene terephthalate. However, the methods proposed to date have not proved to be entirely satisfactory.

Modification of the polyesters by incorporating dye sites in the polymers by selected comonomers ordinarily does not produce satisfactory fiber-forming materials, i.e., the dye affinity may be enhanced but other physical properties such as tenacity, melting point and the like are adversely affected. Accordingly, the art has striven for means to increase the dyeability of polyester structures, such as fibers, filaments, films, and the like without adversely affecting other necessary physical properties.

One such method used successfully to improve the dye affinity of polyesters for dispersed acetate dyes and basic dyes is to conduct the polyester reaction in the presence of a small amount of a difunctional agent which possesses a metallo sulfonate group or sulfonate-forming group and two functional or reactive groups such as hydroxyl or carboxyl and esters thereof. By this novel technique, modified polyesters can be produced which not only possess improved dye affinity for dispersed acetate dyes and may be dyed with basic dyes under temperature and pressure or with carriers, but also, the modified polyesters have the necessary molecular weight required for fiber-forming polyesters and excellent physical properties in fiber form. However it has been found that when starting with terephthalic acid and ethylene glycol such modification of polyesters often fails to produce satisfactory fiber-forming materials. Attempts to conduct the esterification reaction of terephthalic acid and ethylene glycol in the presence of such sulfonate-containing compounds, as, for example, 5-sodium sulfo isophthalic acid has resulted in excessive diethylene glycol formation, resulting in a polymer with a low melting point and poor heat and light stability in the fiber prepared therefrom.

It is an object of this invention to provide an improved method of producing the bis glycol ester of such sulfonate-containing compounds which is unable as an intermediate in the production, from terephthalic acid, of high molecular weight fiber-forming polyesters which have improved dyeing characteristics, including increased affinity for basic dye stuffs, which polyesters also have a useful balance of other desirable physical properties including high molecular weight, high melting point, and good heat and light stability.

Other objects and advantages of this invention will be apparent from the description thereof which follows.

The objects of this invention are accomplished by reacting the dimethyl ester of the metallo sulfo dicarboxylic acid with glycol at a mole ratio of about 4–30 of the glycol to 1 of the dimethyl ester, under ester interchange conditions so as to provide a solution of the bis glycol ester in the glycol of the metallo sulfo dicarboxylic acid containing about 20–75% of the bis glycol ester and having a carboxyl plus carboxylate content of not more than about 200 $\mu$eq/g of bis glycol ester and no more than about 10 weight percent of glycol ether based on bis glycol ester. A conventional ester interchange catalyst and glycol ether suppressant may be employed.

Generally, the process for producing polyesters using the intermediate of this invention comprises forming a reaction mixture comprising an aromatic dicarboxylic acid and excess of polymethylene glycol. Other additives, such as catalyst, chain branching agents, chain terminating agents and/or cross linking agents and the like may also be added with initial ingredients if desired. The reaction mixture is heated to an elevated temperature sufficient to start the reaction between the acid and the glycol, with the elevated temperature being maintained until the reaction is substantially completed as indicated by the cessation of the evolution of the water of reaction, whereby a small amount of monomer and a predominate amount of oligomers and polymers of a low degree of polymerization are formed. During this stage of the reaction, the temperature must be such that the water formed is continuously removed by distillation. It may be desirable, although certainly not necessary, to conduct this stage of the reaction under a pressure of from about 5 psig to 100 psig in order to accelerate the reaction and produce a low molecular weight prepolymer. At a point when the degree of esterification of the prepolymer, as indicated by a carboxyl level of not more than 2000 $\mu$eq/g (ordinarily at above 80% of esterification), and when the prepolymer has an intrinsic viscosity of not more than about 0.07, the preformed bis glycol ester of the sulfonate-containing compound is added in an amount and of such concentration that the resulting glycol/dicarboxylic acid moiety ratio is at least about 1.6. The temperature of the reaction mixture may be raised to remove excess glycol and to condense the resulting intermediate product to a highly polymerized polyester. A reduced pressure is generally applied to aid in removal of the remaining volatile constituent. The reaction preferably is carried out in an oxygen-free atmosphere.

The carboxyl concentration of 2000µeq/g is roughly equivalent to a percentage of esterification of about 80. The theoritical lower limit on the intrinsic viscosity of the prepolymer which is suitable for the addition of the bis glycol ester of the difunctional aromatic compound possessing the sulfonate group is the intrinsic viscosity of a prepolymer consisting entirely of monomer. Such a prepolymer would not normally be obtained and the intrinsic viscosity would not normally be less than about 0.05. Ordinarily, an intrinsic viscosity of 0.05–0.07 will embrace prepolymers having a degree of polymerization of about 2 to 4. It must be appreciated that although the intrinsic viscosity of the prepolymer should not exceed 0.07, an equivalent process may employ a prepolymer of higher viscosity with subsequent depolymerization to an intrinsic viscosity of 0.07 or below, in the presence of the difunctional aromatic compound possessing the sulfonate group.

The dicarboxylic acid employed is preferably terephthalic acid in view of its commercial availability at a relatively low cost and in view of the desirable properties of the polymer that can be produced by using the specific acid. Aromatic dicarboxylic acids which may be used in accordance with the present invention include those having the general formula

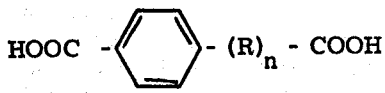

wherein $n$ is either 0 or 1, and R is a radical selected from the group consisting of (a) an alkylene radical containing 1 to 8 carbon atoms;

(b) 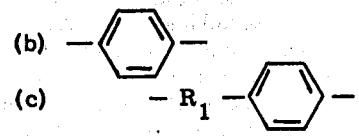

(c)

wherein $R_1$ is an alkylene group containing 1 to 8 carbon atoms;

(d) 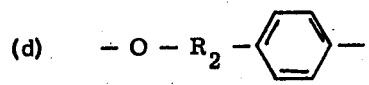

wherein $R_2$ is an alkylene group containing 1 to 8 carbon atoms; and (e) 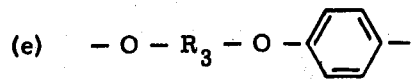

wherein $R_3$ is an alkylene group containing from 1 to 8 carbon atoms.

As examples of suitable aromatic p-dicarboxylic acids having the above general formulas there may be named: terephthalic acid; p,p'-dicarboxy diphenyl; p,p'-dicarboxydiphenylmethane; p,p'-dicarboxydiphenylethane; p,p'-dicarboxydiphenylpropane; p,p'-dicarboxydiphenylbutane; p,p'-dicarboxydiphenylpentane; p,p'-dicarboxydiphenylhexane; p,p'-dicarboxydiphenylheptane; p,p'-dicarboxydiphenyloctane; p,p'-dicarboxydiphenoxymethane; p,p'-dicarboxydiphenoxyethane; p,p'-dicarboxydiphenoxypropane; p,p'-dicarboxydiphenoxybutane; p,p'-dicarboxydiphenoxypentane; p,p'-dicarboxydiphenoxyhexane, and the like. Other useful aromatic dicarboxylic acids that may be used include naphthalene dicarboxylic acids such as 2,6-dicarboxynaphthalene, 2,7-dicarboxynaphthalene, and the like.

Copolyesters can also be prepared with the intermediate of the present invention. For example, mixtures of the aromatic p-dicarboxylic acids defined above or these acids mixed with up to 50 weight percent of an aromatic m-dicarboxylic acid such as isophthalic acid or xylidinic acid may be employed to make a polyester having particularly desirable physical properties. It is necessary that the sole reactive groups of the acid be the two carboxyl groups. Therefore, it will be appreciated that the aromatic dicarboxylic acid may contain substituents that do not enter into the polycondensation reaction. For example, durene, 1,4-dicarboxylic acid may be employed. The invention also includes processes as described above wherein polyesters can be prepared by replacing in part the aromatic dibasic carboxylic acid with up to 30 percent by weight of an aliphatic dicarboxylic acid, such as succinic acid, adipic acid, sebacic acid, alpha, alpha-dimethylglutaric acid, itaconic acid, beta-oxydipropionic acid, alpha, alpha-oxydibutyric acid, fumaric acid, and the like. Longer chain aliphatic dicarboxylic acids such as 1,20-eiconsanedioic acid, 8-ethyl-1, 18-octadecanedioic acid, a mixture thereof, and the like may also be substituted in part for the aromatic dicarboxylic acid. For the purposes of this invention, "polyesters" will be considered to include at least 85% by weight of the ester of a dihydric alcohol and a dicarboxylic acid.

The polymethylene glycol employed in the process of the present invention and/or in the production of the polyester; may be any glycol containing 2 to 10 carbon atoms or polyester-forming derivatives thereof, and more preferably are polymethylene glycol of the general formula $HO(CH_2)_nOH$, wherein n is an integer from 2 to 10 and cyclohexane dimethanol. Illustrative of suitable glycols that may be used for the purposes of this invention are ethylene glycol, 1,5-pentanediol, 1,3-propanediol, 1,6-hexanediol, 1,7-heptanediol, 1,8-octanediol, 1,9-nonanediol, 1,10-decanediol and the like. It is preferred that the glycol used be ethylene glycol.

At least about one molar proportion of the glycol per molar proportion of the acid is employed. However, a molar excess of the glycol is usually employed in the preparation of polyesters. Normally, from about 1.3 to 5 moles of glycol per mole of acid are used.

The sulfonate-containing compound of which the bis-ester is employed, is any organic compound containing at least one sulfonate group and capable of entering into a polyesterification reaction. The sulfonate-containing additive will react with the dicarboxylic acid and the polymethylene glycol prepolymer and will form an integral part of the polymer structure.

Illustrative of sulfonate-containing compounds which may be employed for the purposes of this invention are compounds of the formula

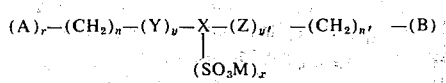

wherein

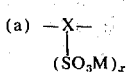

is a member of the class consisting of a metallic salt of a divalent arylene radical and a metallic salt of a divalent alkylene radical, each being of such character that the — $SO_3M$ — groups present are separated from ester-forming units by at least 3 carbon atoms and $x$ is an integer of 1 to 2, b. Y and Z are selected from the group consisting of oxyalkyl, oxyaryl, oxyalkyleneoxyaryl and poly(oxypolymethylene) oxyaryl radicals and $y$ and $y'$ are integers of 0 to 1, c. $n$ and $n'$ are integers of 0 to 10, and d. A is a member selected from the ester-forming units COOH, COOR, and R representing a lower alkyl group of 1 to 6 carbon atoms, B is a member selected from the group consisting of A and hydrogen, and $r$ is an integer of 1 to 2, with the proviso that when $r$ is 2, then B must be hydrogen.

These compounds are well known in the prior art, and descriptions of such compounds may be found in U.S. Pat. Nos. 3,018,272; 3,033,824; 3,077,493; 3,164,566; 3,164,567; 3,164,570; 3,184,434; 3,166,531; and 3,185,671. Preferred is the bis glycol ester of 5-sodium sulfo isophthalic acid, which, according to this invention, is prepared separately from dimethyl-5-sodium sulfo isophthalate and ethylene glycol. The bis glycol ester is prepared as a solution in ethylene glycol and fed to the preformed acid glycol prepolymer as described above.

Preparation of the bis glycol ester intermediate from the dimethyl ester is conducted at temperatures of 160°–250° C using the usual ester interchange catalysts. The ratio of ethylene glycol to dimethyl-5-sodium sulfo isophthalate should be in the range of 4–30. Ratios in the range of about 7–10 are preferred as they result in essentially monomeric bis glycol ester formation without requiring large equipment which would be required at higher ratios.

The following examples are cited to illustrate the invention. They are not intended to limit it in any way.

EXAMPLE 1

The bis-glycol ester of 5-sodium sulfo isophthalic acid was prepared from dimethyl 5-sodium sulfo isophthalate and ethylene glycol using lithium acetate and calcium acetate as ester interchange catalysts. A 900 ml. capacity autoclave was charged with 222 grams (0.75 mole) of dimethyl 5-sodium sulfo isophthalate, 372 grams (6.0 moles) of ethylene glycol, 0.60 grams of calcium acetate monohydrate, and 0.38 grams of lithium acetate dihydrate. The autoclave was heated to a temperature of 165°–210° C and methanol was collected by distillation during a period of 90 minutes. A small amount of ethylene glycol distilled along with the methanol. From the autoclave was obtained a 50% solution of the bis glycol ester of 5-sodium sulfo isophthalic acid in ethylene glycol. This solution was analyzed and found to have a carboxyl level of 9μeq/g of solution and a carboxylate level of 31μ eq/g of solution.

The 50% solution had a diethylene glycol (DEG) ethylene glycol (EG) weight ratio of 0.012, indicative of a low level of DEG.

This EG solution of the bis glycol ester of 5-sodium sulfo isophthalic acid exceeded the solubility limit and over a period of several days the solid bis glycol ester slowly precipitated. For storage over long periods of time it is advantageous to dilute the solution further with EG such that the final solution contains approximately 20–25% bis glycol ester.

While this example employs a mole ratio of ethylene glycol to dimethyl-5-sodium sulfo isophthalate of 8 to 1, other mole ratios can be employed, so long as there is an excess of ethylene glycol. Ratios of 4:1 have been effectively employed. Any common ester-interchange catalyst may be used.

The dimethyl-5-sodium sulfo isophthalate can be prepared, as is well known in the art, by sulfonation of isophthalic acid with oleum, reacting the 5-sulfo isophthalic acid so formed with methanol to form dimethyl-5-sodium sulfo isophthalate, and neutralizing this compound with caustic or sodium containing compound to form the desired dimethyl-5-sodium sulfo isophthalate.

EXAMPLE 2

This example describes the preparation of a cationic dyeable polyester via a batch terephthalic acid (TA) process using an ethylene glycol (EG) solution of the bis glycol ester of 5-sodium sulfo isophthalic acid.

A reactor was charged with 162 grams terephthalic acid, 152 grams ethylene glycol, 0.10 grams of antimony glycoloxide, 1.97 grams of an alkoxy polyoxyalkalene glycol chain terminator having a general formula $R—O[G-O]_x—H$ where R equal 14–15 and $x$ equal 14, 0.02 grams pentaerythritol, and 0.04 grams lithium acetate. The mixture was esterified by heating for 90 minutes at a temperature of 240°C during which time water and ethylene glycol were continually removed. After completion of esterification 37.6 grams of a 24% solution in ethylene glycol of the bis glycol ester of 5-sodium sulfo isophthalic acid was added, the temperature increased to remove excess ethylene glycol and polymerization completed at a temperature of 280° C with a vacuum of less than 1 mm. The polymer obtained after 30 minutes polymerization time had a specific viscosity of 0.275, a DTA melting point of 250° C, and contained 0.65 weight percent diethylene glycol (DEG). The polymer was spun and drawn 5.1 times to a yarn of excellent whiteness. Microscopic examination revealed that no aggregates of the dye additive were present in the yarn. The fiber dyed to a dark shade with Sevron Blue 2G (CI Name: Basic Blue 22; no CI number) cationic dye.

EXAMPLE 3

A 3-gallon, stirred-tank reactor equipped with rectification column and condenser was charged with 3333 grams of sodium 5-sulfodimethylisophthalate, 5586 grams of ethylene glycol and 22.8 grams of lithium acetate dihydrate (KP5C-Run 84). The reactor was purged with nitrogen and put under a 5 psig nitrogen blanket prior to start of the heating cycle. When the reaction mixture temperature reached 140° C, which is slightly below the temperature at which significant transesterification takes place, the reactor pressure was reduced to atmospheric by gradually releasing nitrogen through the rectification column and condenser. In approximately 45 minutes after beginning the heating cycle, the reaction mixture reached 180° C. After maintaining this temperature for 10 minutes, the temperature was increased to 200° C at a rate of 5° C per 10 minutes. To minimize loss of ethylene glycol during distillation of the methanol by-product, the top of the packed rectification column was maintained at 66° to 70° C by controlling the reflux rate to the column. The mixture was held at 200° C for 40 minutes, the heat to the reactor and reflux to the column were stopped and the batch forced by nitrogen pressure through a nominal 5μ glass fiber filter into a nitrogen blanketed receiver. The solution containing approximately 48 weight percent of the bis-glycol ester was cooled and further diluted with ethylene glycol to 21 weight percent. The theoretical degree of polymerization of the bis-glycol ester was 1.14. Analytical results gave a carboxyl concentration of 13μeq/gm of the bis glycol ester, a carboxylate concentration of 60μeq/gm of the bis glycol ester and a diethylene glycol concentration (DEG) of 0.56 weight percent based on weight of the bis glycol ester.

EXAMPLE 4

This example describes the preparation of a cationic dyeable polyester via a continuous terephthalic acid (TA process using the ethylene glycol (EG) solution of the bis glycol ester described in Example 3.

A TA-EG slurry batch containing 40.0 lbs. of TA, 30.0 lbs. of EG, 2.24 grams of pentaerythritol, 16.80 grams of triphenyl phosphite, 13.44 grams of lithium acetate dihydrate, 1.00 gram of a commercial antifoam agent (otherwise non functional) known as Antifoam "A", 220.6 grams of a monohydroxyl alkoxy poly(oxyalkylene) glycol having the structural formula:

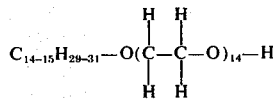

4.75 grams of manganese acetate tetrahydrate, 11.20 grams of 2,2'-ethylenedioxy-bis(1,3,2-dioxyastibolane) and 67.2 grams of titanium dioxide was metered at 55.0 gm/min into a stirred tank reactor operating at 250° C under a pressure of 20 psig with a residence time of 2.5 hours. The product from this reactor had an intrinsic viscosity of 0.07 and a carboxyl end group concentration of 769μeq/gm. Byproduct water and EG were continuously distilled from the reactor and condensed.

This prepolymer along with 7.26 gm/min of the solution of bis glycol ester described in Example 3 were metered into a second stirred tank reactor operating at 230° C under a reduced pressure of 260 mm Hg with a residence time of 2.3 hours. The molar ratio of total EG to TA entering the second reactor was 1.82 and the ratio of total EG to total dicarboxylic acid was 1.77. The product from reactor 2 had an intrinsic viscosity of 0.09 and a carboxyl end group concentration of 100μeq/gm. Water and EG were continuously distilled from the reactor and condensed.

The prepolymer was further condensed in a bubble-cap column operating at atmospheric pressure with a countercurrent flow of nitrogen at 0.34 standard cubic feet per minute. The column product was at 260° C and had an intrinsic viscosity of 0.18 and a carboxyl end group concentration of 42μeq/gm. Condensation was completed in a rotating cage finisher operating at 1.6 mm Hg and 265° C with a residence time of 1.9 hours and product rate of 37.8 gm/min. This copolymer was spun and drawn into a continuous filament yarn having an intrinsic viscosity of 0.54, a carboxyl end group concentration of 20μeq/gm, a diethylene glycol (DEG) concentration of 1.5 wt. % and melting point of 249° C. The yarn had a tenacity of 3.5 gm/denier, a sulfonate group concentration of 108μeq/gm and a basic dye uptake of 103μeq/gm.

By measuring specific viscosity ($\eta$sp) at 25° C at a given concentration (½–4%) of the prepolymer in a solvent having a molar ratio: 2 phenol/1 trichlorophenol, the intrinsic viscosity ($\eta$) is then calculated using the relationship $[\eta] = (\sqrt{2}/c) [\eta \text{ sp} - 1 \; n\eta_{rel}]^{1/2} \eta_{rel} = 1 + \eta$ sp As is well known in the art, the carboxyl end group concentration can be determined by titration of the prepolymer with potassium hydroxide. Ethylene glycol/terephthalic acid molar ratios can be determined, as is well known in the art, by material balance.

Glycol ether (diethylene glycol) content is determined by gas chromatographic analysis after saponification of the polymer or prepolymer.

Melting points were determined from endotherms obtained with a duPont Differential Thermal Analyzer.

It is understood that changes and variations may be made in the present inventions without departing from the spirit and scope thereof as defined in the appended claims.

We claim:

1. The process of preparing a bis glycol ester of a difunctional aromatic compound possessing one or more metallo sulfonate groups and suitable for use in a subsequent continuous or non-continuous preparation of fiber-forming cationic dyeable copolyesters by copolymerization of the bis glycol ester with a low molecular weight glycol-dicarboxylic acid prepolymer comprising reacting a dimethyl ester of a metallo sulfo dicarboxylic acid with a glycol at a mole ratio of about 4–30 of the glycol to 1 of the dimethyl ester at a temperature of about 160°–250° C and at a pressure of 0–100 psig so as to provide a solution of the bis glycol ester of the metallo dicarboxylic acid containing 20–75% of the bis glycol ester and having a carboxyl plus carboxylate content of not more than about 200μeq/g of bis glycol ester and no more than about 10 weight percent of glycol ether based on the bis glycol ester 2. The process of claim 1 wherein an ester interchange catalyst is employed.

3. The process of claim 2 wherein said ester interchange catalyst is lithium acetate and/or calcium acetate.

4. The process of claim 1 wherein said metallo sulfo dicarboxylic acid is a metallo sulfo isophthalic acid.

5. The process of claim 1 wherein the mole ratio is about 7–10 of the glycol to 1 of the dimethyl ester.

6. The process of claim 1 wherein the glycol is ethylene glycol.

7. The process of preparing a bis glycol ester of a difunctional aromatic compound possessing one or more metallo sulfonate groups and suitable for use in a subsequent continuous or non-continuous preparation of fiber-forming cationic dyeable copolyesters by copolymerization of the bis glycol ester with a low molecular weight glycoldicarboxylic acid prepolymer comprising reacting a dimethyl ester of a metallo sulfo isophthalic acid with ethylene glycol at a mole ratio of about 4–30 of the glycol to 1 of the dimethyl ester at a temperature of about 160°–250° C and at a pressure of about 0–100 psig so as to prepare a solution of the bis glycol ester of the metallo isophthalic acid containing 20–75% of the bis glycol ester and having a carboxyl plus carboxylate content of not more than about 200µ eq/g of bis glycol ester and no more than about 10 weight percent of diethylene glycol based on the bis glycol ester.

8. The process of claim 7 wherein an ester interchange catalyst is employed.

9. The process of claim 8 wherein said ester interchange catalyst is lithium acetate and/or calcium acetate.

10. The process of claim 7 wherein said metallo sulfo isophthalic acid is 5-sodium sulfo isophthalic acid.

11. The process of claim 7 wherein the mole ratio is about 7–10 of the glycol to 1 of the dimethyl ester.

12. A 20–75% solution in glycol of a bis glycol ester of a metallo sulfo dicarboxylic acid having a carboxyl plus carboxylate content of not more than about 200µeq/g of bis glycol ester, and no more than about 10 weight percent of diethylene glycol based on the bis glycol ester.

13. The solution of claim 12 wherein the metallo sulfo dicarboxylic acid is 5-sodium sulfo isophthalic acid.

14. The solution of claim 12 containing about 20–50% of the bis glycol ester.

15. The solution of claim 12 wherein bis glycol ester has a carboxyl plus carboxylate content of about 80µeq/g of bis glycol ester.

16. The solution of claim 12 wherein the solvent is ethylene glycol.

* * * * *

UNITED STATES PATENT OFFICE
CERTIFICATE OF CORRECTION

PATENT NO. : 3,936,389
DATED : February 3, 1976
INVENTOR(S) : Henry L. King and John W. McGee It is certified that error appears in the above-identified patent and that said Letters Patent are hereby corrected as shown below:

Col. 2, line 11 "unable" should read ---suitable---.
Col. 7, line 50 "769 eq/gm" should read ---760 eq/gm---.

Signed and Sealed this

Twenty-eighth Day of September 1976

[SEAL]

Attest:

RUTH C. MASON
Attesting Officer

C. MARSHALL DANN
Commissioner of Patents and Trademarks